Aug. 4, 1942. C. J. GOESKE 2,291,597
HUB CAP FOR MOTOR VEHICLE WHEELS
Filed May 23, 1941 2 Sheets-Sheet 1
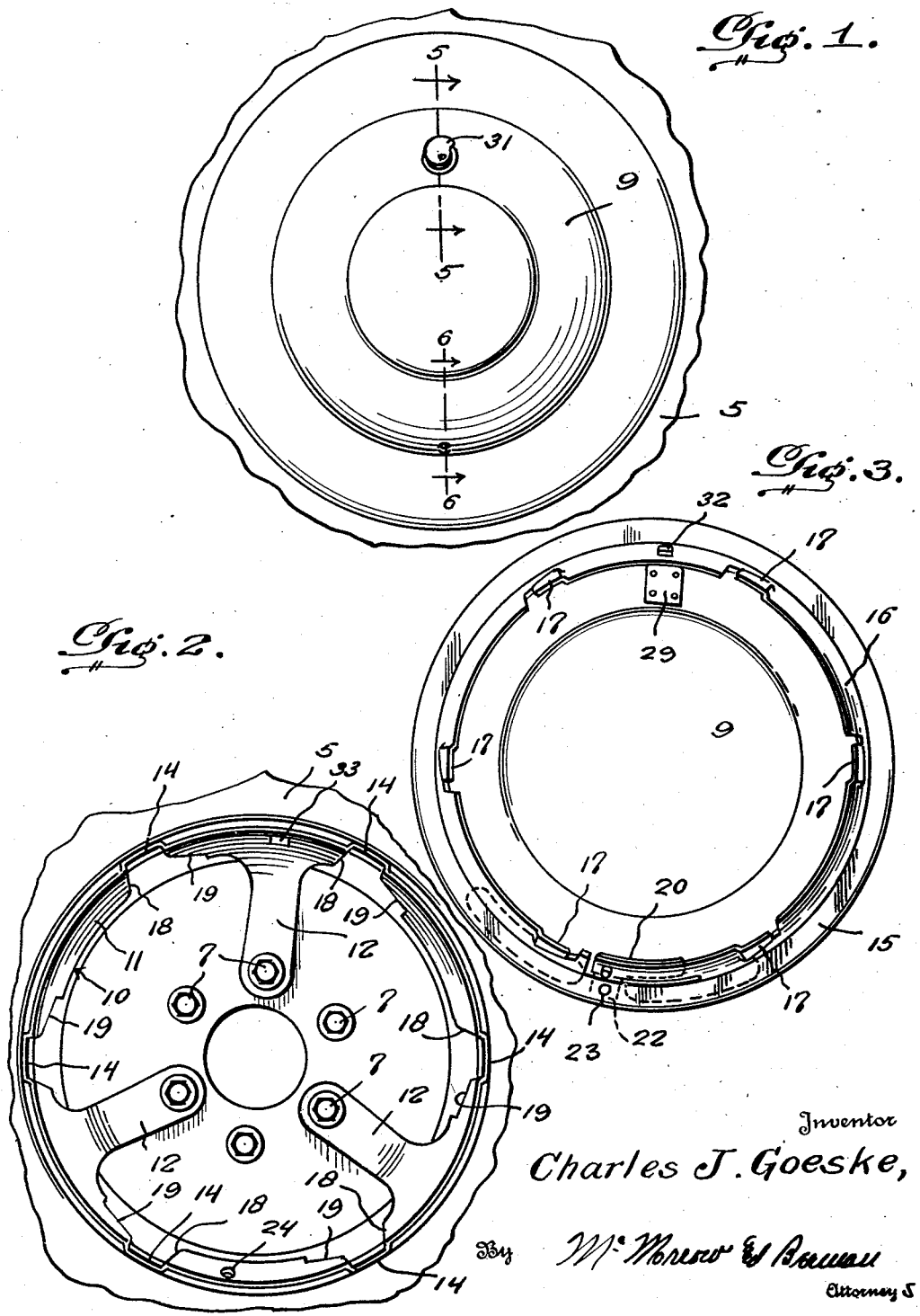
Inventor
Charles J. Goeske,
By McMorrow & Berman
Attorneys Aug. 4, 1942.            C. J. GOESKE              2,291,597
                HUB CAP FOR MOTOR VEHICLE WHEELS
                 Filed May 23, 1941        2 Sheets-Sheet 2
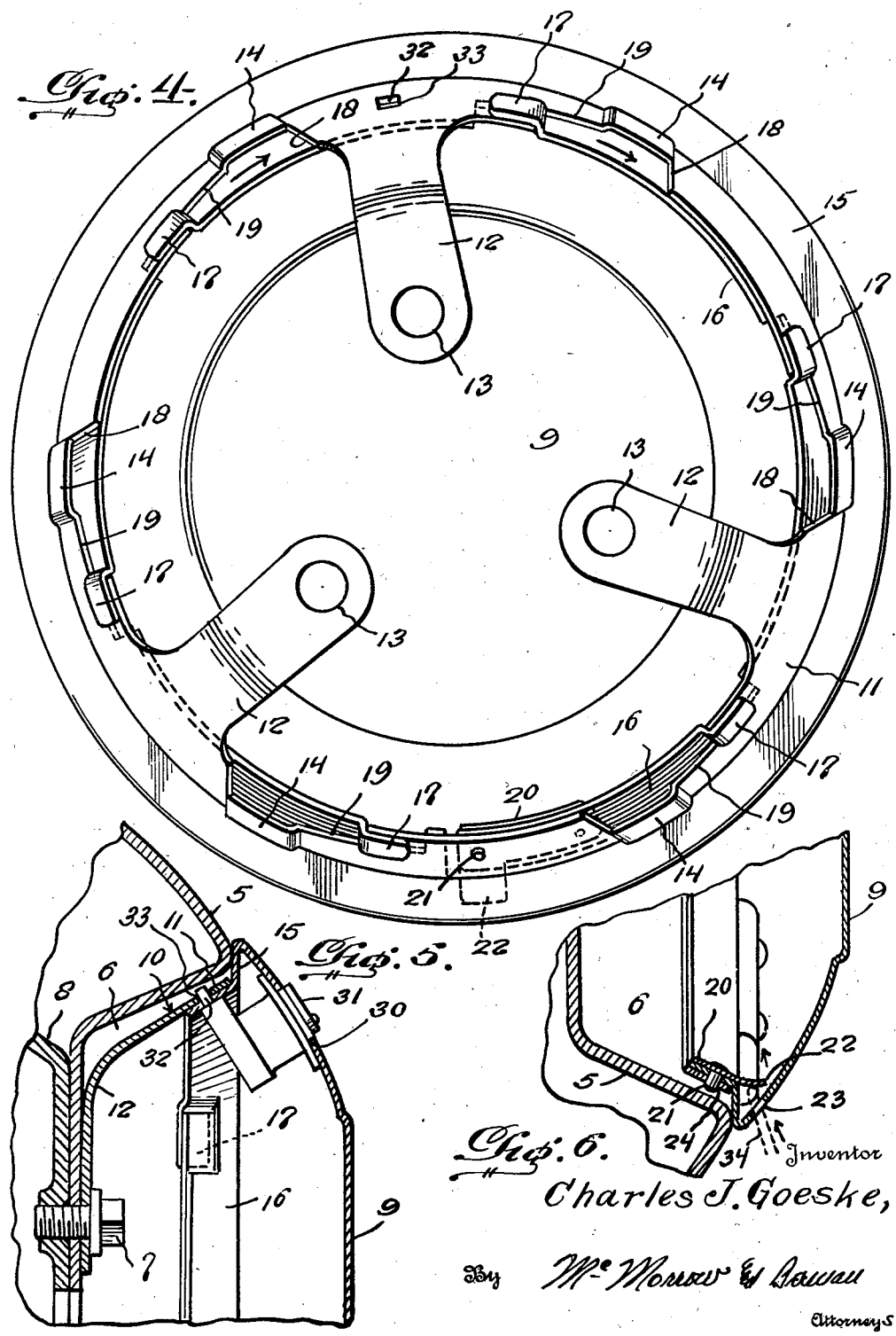

Patented Aug. 4, 1942

2,291,597

UNITED STATES PATENT OFFICE 2,291,597

HUBCAP FOR MOTOR VEHICLE WHEELS

Charles J. Goeske, Henryetta, Okla.

Application May 23, 1941, Serial No. 394,916

3 Claims. (Cl. 301—108)

This invention relates to a hub cap for motor vehicle wheels and may be shaped exteriorly to harmonize with varying designs of wheels or motor vehicle constructions and has the usual purpose of providing a neat and attractive appearance to the wheel by concealing from view the wheel hub and the securing means of the wheel on the hub.

The primary object of this invention is the provision of a hub cap of the above stated character which will be extremely easy to remove and replace and will be positively secured against loss while in use on the wheel and be prevented from rattling and may be locked in place if desired to prevent the unauthorized removal of the wheel from the hub.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which—

Figure 1 is a side elevation illustrating the exterior appearance of the hub cap and showing a fragmentary portion of a motor vehicle wheel, the hub cap being constructed in accordance with my invention.

Figure 2 is a side elevation illustrating an interior view of the wheel hub cavity and the securing means for the wheel and showing the insert forming a portion of the present invention installed in the cavity.

Figure 3 is a side elevation illustrating the interior of the cap.

Figure 4 is a side elevation illustrating the interior of the cap and its mounting.

Figure 5 is a fragmentary sectional view taken on the line 5—5 of Figure 1, showing the means of positively locking the cap in place.

Figure 6 is a fragmentary sectional view taken on the line 6—6 of Figure 1 showing the means of latching the cap in place.

Referring in detail to the drawings, the numeral 5 indicates a fragmentary portion of a motor vehicle wheel and of a construction which is now frequently employed upon motor vehicles, including the usual hub cavity 6 and demountably secured in place by stud bolts 7 passing through the wheel and threaded in openings provided in the usual brake drum 8 carried by the wheel hub (not shown). The heads of the stud bolts are located within the cavity 6 of the wheel 5 and present an unsightly appearance unless concealed from view by a hub cap 9 forming a closure for the cavity 6 of the wheel 5. Various means have been employed for mounting the hub caps on wheels of motor vehicles, a great many of such means being very difficult to actuate for the removal and replacement of the cap besides not firmly securing the cap in place and against loss.

The present invention which includes a cap 9 and other features which will be hereinafter more fully described in detail eliminate any possibility of the cap being lost and will permit said cap to be easily removed and replaced and when locked in position on the wheel will prevent the unauthorized removal of the wheel owing to the fact that it will be impossible to remove the stud bolts 7 until such time that the cap 9 has been removed.

The cap 9 may have its general outward appearance varied so as to harmonize with different designs of motor vehicle wheels without departing from the spirit of this invention. In order that the cap 9 be secured on the wheel 5 in accordance with the present invention, an adapter 10 is employed. This adapter is located within the cavity 6 of the wheel 5 and may be bolted or welded onto the wheel or removably secured on said wheel in accordance with the showing made in the drawings and which will be hereinafter fully described.

The adapter includes an annular band-like member 11 provided with attaching arms 12, the extremities of which are provided with openings 13 to receive some of the stud bolts 7, thereby removably mounting the adapter within the cavity 6 of the wheel 5. The arms 12 are curved, as clearly shown in Figure 5, to position the band-like member 11 of the adapter in close proximity to the mouth of the cavity. The band-like member 11 has struck therefrom offsets 14 each of which is slightly offset from the plane of the band-like member and are employed for releasably securing the cap 9 onto the adapter.

The cap 9 has an inwardly extending flange 15 on which is integrally formed a band-like flange 16 extending at an angle to the flange 15 and adapted to be received within the band-like member 11 of the adapter 10. The band-like flange 16 has struck therefrom tongues 17 slightly offset from the plane of said flange 16 and adapted to lie in approximately the same plane of the offsets 14 of the adapter 10 when the cap is in assembled position or brought into applying position in relation to the adapter, the offsets at this time acting as abutments for limiting the movement of the cap in the direction of the wheel by the tongues 17 engaging the inner edges of the offsets 14.

In forming the offsets 14 in the adapter 10 the member 11 thereof has portions thereof cutaway, as shown at 18, and which extend for the full length of the offsets 14 and for a limited distance beyond one end of each offset so as to present cam faces 19 to be engaged by the tongues 17 when the cap is rotated in one direction to bring the tongues 17 into overlapping relation with the member 11 for releasably securing the cap on the adapter. The tongues 17 riding against the cam faces 19 tend to draw the cap tightly onto the adapter and against the wheel 5.

Figure 4 shows the tongues 17 in overlapping relation with the band-like member 11 of the adapter for releasably securing the cap on the wheel and also for firmly securing the cap in place so that it may not rattle while in use on the wheel.

A portion of the band-like flange 16 of the cap 9 is transversely and longitudinally slotted to provide a resilient catch 20 including a pin 21 and a lateral extension presenting a tool engaging ear 22 positioned in alignment with an opening 23 provided in the wall of the cap 9. The band-like member 11 of the adapter 10 is provided with a keeper opening 24 in which the pin of the catch moves when the tongues 17 have been brought into overlapping relation with the band-like flange of the cap. The pin of the catch fitting within the keeper opening will prevent reverse rotation of the cap and consequently prevent its accidental removal from the wheel.

A conventional key-operated lock 29 is mounted on the inner face of the cap 9 with the key opening thereof exposed to view from the exterior of the cap by way of an opening 30 normally closed by a pivotally mounted dust plate 31. The lock 29 further includes a slidable plunger 32 movable through the band-like flange 16 of the cap and is adapted to move into and out of a keeper slot 33 provided in the band-like member 11 of the adapter.

The lock 29 will prevent the unauthorized removal of the cap from the wheel and as the cap at this time cannot be removed it will be impossible to gain access to the stud bolts 7 and consequently the wheel 5 cannot be removed by an unauthorized person from the motor vehicle.

The lock 29 is actuated by a key from the outside of the cap 9 for the purpose of retracting the plunger 32 from the keeper slot 33. After the plunger 32 has been moved into an unlocked or retracted position, a tool or instrument, indicated by the character 34, is inserted through the opening 23 of the cap 9 and against the ear 22 for flexing the catch 20 and thereby move the pin 21 thereof out of the keeper opening 24. The cap may then be rotated in a reverse direction to move the tongues 17 from engagement with the band-like member of the adapter to bring said tongues opposite the offsets 14 whence the cap may be withdrawn outwardly from the wheel.

It is to be understood that any number of offsets 14 and cutouts may be provided in the adapter and that the cap will have a number of tongues in accordance with the number of offsets 14 employed on the adapter. Further, it is to be understood that the cap may be constructed of any material suitable for the purpose as well as the adapter.

While I have shown and described the preferred embodiment of my invention, it will be understood that minor changes in construction, combination and arrangement of parts may be made without departing from the spirit and scope of the invention as claimed.

Having thus described the invention, what I claim is:

1. In combination with a motor vehicle wheel having a hub cavity and fasteners for securing the wheel on a hub and located in the cavity, an adapter located in the hub cavity of said wheel, means on said adapter to receive the fasteners, said adapter including an annular band-like member provided with cutout portions presenting cam faces and offsets acting as stops, a cap element for closing the cavity and having a band-like flange fitting within the band-like member of the adapter, and tongues struck from said flange to engage the stops and ride the cam faces for drawing the cap onto the wheel and the adapter and come to rest in overlapping relation with the flange for releasably securing the cap element on the adapter.

2. In combination with a motor vehicle wheel having a hub cavity and fasteners for securing the wheel on a hub and located in the cavity, an adapter located in the hub cavity of said wheel, means on said adapter to receive the fasteners, said adapter including an annular band-like member provided with cutout portions presenting cam faces and offsets acting as stops, a cap element for closing the cavity and having a band-like flange fitting within the band-like member of the adapter, tongues struck from said flange to engage the stops and ride the cam faces for drawing the cap onto the wheel and the adapter and come to rest in overlapping relation with the flange for releasably securing the cap element on the adapter, and a spring catch carried by the flange of the cap and engageable with the adapter.

3. In combination with a motor vehicle wheel having a hub cavity and fasteners for securing the wheel on a hub and located in the cavity, an adapter located in the hub cavity of said wheel, means on said adapter to receive the fasteners, said adapter including an annular band-like member provided with cutout portions presenting cam faces and offsets acting as stops, a cap element for closing the cavity and having a band-like flange fitting within the band-like member of the adapter, tongues struck from said flange to engage the stops and ride the cam faces for drawing the cap onto the wheel and the adapter and come to rest in overlapping relation with the flange for releasably securing the cap element on the adapter, a spring catch struck from said flange of the cap and including an extension and a pin, said band-like member of the adapter having an opening to receive the pin, said cap having an opening to permit an instrument passed therethrough to engage the extension for flexing the catch to move the pin out of the opening.

CHARLES J. GOESKE.